United States Patent [19]
Gehrmann

[11] Patent Number: 4,748,508
[45] Date of Patent: May 31, 1988

[54] SUCCESSIVE APPROXIMATION TYPE CONTROL OF THE ELECTRON BEAM OF A CAMERA TUBE

[75] Inventor: Rainer Gehrmann, Alsbach-Hähnlein, Fed. Rep. of Germany

[73] Assignee: Robert Bosch GmbH, Stuttgart, Fed. Rep. of Germany

[21] Appl. No.: 944,331

[22] Filed: Dec. 19, 1986

[30] Foreign Application Priority Data

Dec. 21, 1985 [DE] Fed. Rep. of Germany ....... 3545638

[51] Int. Cl.$^4$ ............................................. H04N 5/21
[52] U.S. Cl. ................................... 358/222; 358/223; 358/219
[58] Field of Search ............... 358/219, 220, 222, 223, 358/213.22

[56] References Cited

U.S. PATENT DOCUMENTS

| | | | |
|---|---|---|---|
| 4,418,360 | 11/1983 | Glasgow | 358/108 |
| 4,492,981 | 1/1985 | Taketoshi et al. | 358/217 |
| 4,495,520 | 1/1985 | Kravitz et al. | 358/219 |
| 4,540,919 | 9/1985 | Ryan | 315/384 |
| 4,570,184 | 2/1986 | Spidell | 358/217 |
| 4,593,321 | 6/1986 | Blom et al. | 358/219 |
| 4,633,145 | 12/1986 | Osawa et al. | 315/383 |
| 4,663,666 | 5/1987 | Bloom | 358/166 |
| 4,682,077 | 7/1987 | Maruyama et al. | 315/14 |
| 4,698,558 | 10/1987 | Kakizaki et al. | 315/383 |

FOREIGN PATENT DOCUMENTS

2126853A 3/1984 United Kingdom .

Primary Examiner—Robert Lev
Attorney, Agent, or Firm—Frishauf, Holtz, Goodman & Woodward

[57] ABSTRACT

Dynamic beam current reserve margin in television camera tubes necessary for the neutralizing of bright spots, which is accumulated on the camera tube signal electrode during a multiplicity of successive picture field periods after which a signal electrode is scanned by the electron beam during several field periods in interlaced line pattern and the video signal level of the third field is measured. In this measurement, the signal level is below a first predetermined threshold value, the dynamic beam current reserve is sufficient and the procedure is terminated. The threshold is reached or exceeded, the dynamic rise of the beam current is gradually magnified and further cycles of charge and scanning are performed, this time with measurement of the video signal during the second field. So long as the measured video signal remains below a second predetermined threshold value, the limiting of the beam current rise is magnified until the video signal in a further measurement cycle exceeds the second threshold value. The first and second threshold values are typically 110% of the normal video level and 50% of the video level of the first field respectively.

9 Claims, 2 Drawing Sheets

SUCCESSIVE APPROXIMATION TYPE CONTROL OF THE ELECTRON BEAM OF A CAMERA TUBE

CROSS REFERENCE TO RELATED APPLICATION

R. GEHRMANN, filed Dec. 3, 1986, Ser. No. 937216, filed 12-3-86, claiming priority of German (Federal Republic) Application No. P 35 42 758; R. GEHRMANN, filed Dec. 4, 1986, Ser. No. 937878 filed 12-4-86, claiming priority of German (Federal Republic) Application No. P 35 42 973, and R. MESTER, filed Dec. 2, 1986, Ser. No. 936827 filed 12-2-86, claiming priority of German (Federal Republic) Application No. P 35 43 540.

This invention relates to a successive approximation method of automatic adjustment of the dynamic electron beam reserve in television camera tubes necessary for the neutralization of peak light effects or bright spots.

In such an equilibration method the signal electrode of the camera tube is differently scanned from one field to the next after setting up of the normal intensity level of the beam current.

A moving bright spot or a large area white field many times above the normal level projected on the signal electrode of the camera tube is commonly used for visual determination or evaluation of the so-called "pulling on white" effect, or of the tendency of the automatic beam control (ABC) to oscillate in the camera tube. Then by reference to a reproduced monitor picture the ABC amplification adjustment for dynamic beam current increase is changed (i.e., raised) until the disturbing pulling effect has reached a limit. Likewise, by reference to the monitor picture or to a corresponding oscillogram, the adjustment control for the limiting of the dynamic beam current rise is changed until the tendency to oscillation vanishes. This known method is applicable neither to a television camera automatic adjustment nor to an automated measuring bench, except only very poorly.

A successive approximation method for the adjustment of the electron beam current of a television camera tube for the discharge of the signal electrode at in the case of bright spots is known, however, from British Patent No. 2 126,853 A in which the electron beam is blanked during successive picture field periods and accordingly a double charge is accumulated on the signal electrode. This charge is thereafter scanned off in a following field period during which the beam current must have a setting corresponding to complete the discharge of the signal electrode. This known method has the disadvantage that bright spots can be neutralized only up to twice the normal intensity level. Furthermore, in that disclosure it was not specified in what manner the equilibration method is carried out.

SUMMARY OF THE INVENTION

It is an object of the present invention to provide an equilibration method of the above-mentioned kind in which all values of bright spots that appear are automatically neutralized.

Briefly, charging of the signal electrode is produced during a plurality of successive picture field periods in such a way that the charge produced by illumination of the signal electrode accumulates and then the signal electrode is beam-scanned during several successive field periods in an interlaced manner so that, in a first phase of the method the video signal produced during the third field is measured and in case a first predetermined threshold value is not reached, this cycle of the procedure is terminated, but in the case of this predetermined threshold being exceeded, the dynamic increase of the beam current is gradually magnified, and in a second cycle, after a repeated accumulation of charge on the signal electrode over a plurality of picture fields, the signal electrode is scanned off by interlaced scanning with measurement of the video signal in the second picture field and in the case failure to reach a second predetermined threshold value, the limiting of the beam current increase is raised until the video signal exceeds this second threshold value in a further equilibration cycle.

The successive approximation procedure of the invention has the advantage that automatic equilibration or calibration of the beam current regulation function in a television camera is substantially simplified and shortened and also carried out more reliably and a good degree of automation of the procedure is made possible.

It is particularly useful in the method of the invention for the charged signal electrode to be scanned with intermittent blanking of a field. It is also advantageous to scan the signal electrode intermittently with a modified scanning pattern in such a way that the electron beam does not impinge on certain locations.

It is also useful to scan the signal electrode with intermittent vertical offset, field by field, in such a way that the scanning patterns of two successive fields are written one on the other.

Another useful feature to include in the method is to begin the accumulation process repeatedly with an integration time of 8 to 32 field periods. The first predetermined threshold level is preferably about 110% of the video signal level, and the second predetermined threshold value about 50% of the video signal level of the first field. The procedure preferably involves digitizing the measurement values obtained from the video signal, storing them, comparing them with a previously stored reference measurement value, deriving an adjustment value therefrom and digitally storing it, and finally converting the adjustment value from digital to analog form for setting of the beam current and supplying it to means for controlling the beam current. The previously stored reference measurement value is advantageously derived from the video signal immediately preceding the beginning of the preliminary accumulation phase of the next cycle of the method.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
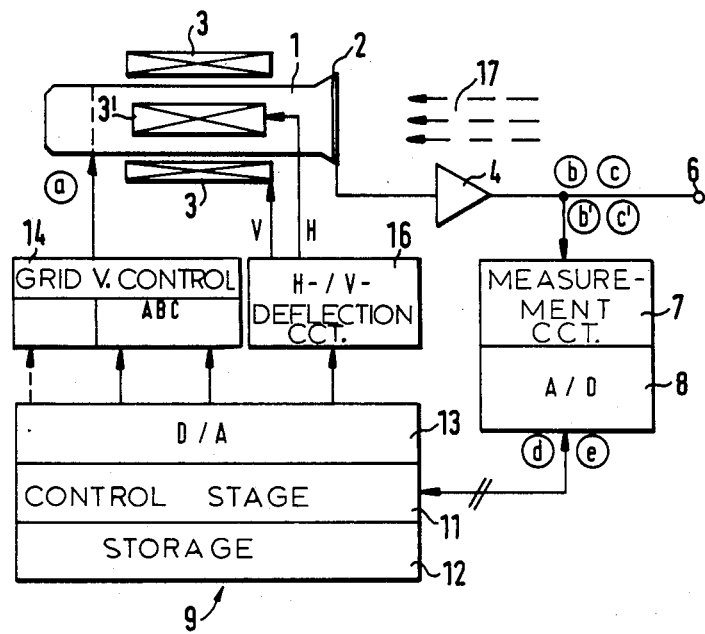
FIG. 1 is a block diagram of a circuit for carrying out the method of the invention.

FIG. 1 shows a television camera tube 1 having a signal electrode 2 and a vertical deflection coil 3. An amplifier 4, in which the video signal produced is amplified, is connected to the signal electrode 2. The amplified video signal then is made available to the output 6 for further processing.

For carrying out the successive approximation method of the invention, a measurement circuit 7 is provided with its input connected to the output of the amplifier 4. The measurement circuit 7 is connected to an analog to digital converter 8, at the output of which there is made available a digital measurement value for processing in the control unit 9 in accordance with the successive approximation procedure. The unit 9 consists essentially of the control stage proper, designated 11, storage means 12 and a digital-to-analog converter 13. In the control stage 11, the digital measurement values provided by the analog-to-digital converter 8 are compared with a value already present, in each case, in the storage means 12. A new adjustment values is derived from the comparison and then likewise stored. The new digital adjustment value is then converted to an analog adjustment value in the digital-to-analog converter 13 and provided to a grid voltage control stage 14 by which the electron beam current value is controlled for the scanning of the signal electrode 2. The beam current control according to the equilibration method of the invention has an effect aiming at optimal utilization of the charges on the signal electrode 2. In addition, the deflection circuit 16 for modifying the vertical deflection current in the vertical deflection coil 3 is also connected to the control stage 11 for an intermittent vertical scanning offset operation further described below.

The equlibration method of the invention can now be described in more detail by reference to FIGS. 2 and 3, in which the electrical connections designated by circled lower case letter symbols in FIG. 1 correspond to the signals graphed in FIGS. 2 and 3 which appear at the respective connections, the signals being designated in FIGS. 2 and 3 by the same lower case letter symbols.

During the entire calibration method, the signal electrode 2 is illuminated with diffused light 17, corresponding to a signal level of 100% on the objective lens side of the television camera. In the beginning of the procedure of the invention, a signal charge corresponding to peak light value is preliminarily established on the signal electrode 2 either by failure to scan the signal electrode 2, i.e., by setting off the electron beam, by means the blanking pulse tied to the grid electrode of camera tube 1 in accordance with line a of FIG. 2 or else by timewise modification of the scanning pattern by means of corresponding control of the deflection circuit 16 for the vertical deflection coil 3 and the horizontal deflection coil 3' in such a way that certain locations on the signal electrode are not impinged on by the electron beam, or else by intermittent offsetting of the lines of a picture field on the lines of the other picture field by means of corresponding control of the deflection circuit 16 for the vertical deflection coil 3, a charge being built up on the signal electrode 2 by this preliminary step.

Figure 2:
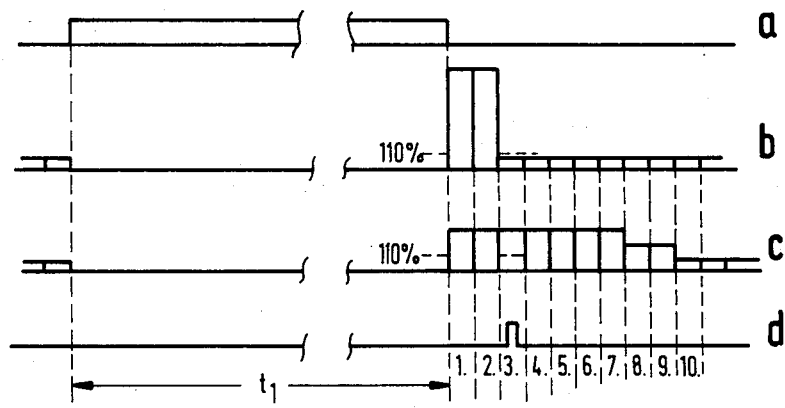
FIG. 2 is a graph of signals appearing in the circuit of FIG. 1, in a first equilibration phase.

The signal electrode 2, illuminated with a light intensity corresponding to 100% signal current, is then left unscanned for periods of from 6 or 8 fields to 30 or 32 fields long, so that at the output of the amplifier 4 no video signal can be produced during these periods ($t_1$ in FIG. 2). The charge thus accumulated is then scanned in a normal interlaced scanning. If sufficient signal extinction of the accumulated charge by such scanning a video signal is produced, the result is shown in line b of FIG. 2, whereas when there is insufficient charge erasing, a signal as represented on line c of FIG. 2 is produced. The video signal of line b of FIG. 2 reaches a signal level in the first two fields which corresponds to the accumulated charge. In that case there are both sufficient beam current reserves and ideal focusing conditions. The signal electrode 2 is thus stabilized after the second field. Beginning with the third field, the signal level is brought back again to about 100% video level.

In the case of the video signal shown in line c of FIG. 2, the beam current reserve margin has not been sufficient during the first two fields for completely discharging the signal electrode, so that the video signal produced during several successive field periods still remains substantially greater than 100%. Only by the 8th and 9th fields can a decline of the video signal be recognized, i.e., a slight neutralization of the signal electrode 2. At this stage a first characteristic for evaluation of the functional quality of the electron beam dynamics is provided, with reference to whether a sufficiently great beam current reserve capability is provided at this stage. The criterion of this evaluation is whether, in the third field after the end of the accumulation phase a first threshold value of, for example 110% of the video signal level, fails to be reached or, on the other hand, is exceeded. It follows accordingly that, by means of a measuring pulse illustrated on line d of FIG. 2, a measurement of the video signal is made in the third field, from which the control stage 11 recognizes whether the predetermined first threshold value, of e.g. 110% of the signal level, has been exceeded or has not been reached. Failure to reach this signal level means that the beam current reserve is sufficient, with the result that the equilibration method is terminated at the ends of this phase, as illustrated in line b of FIG. 2.

If this threshold is reached or exceeded, however, it is then necessary to raise the dynamic beam current reserve. For this purpose, a corresponding adjustment value is generated by the output stage 11 and, after digital to analog conversion is supplied to the ABC amplification adjustment input of the voltage control stage 14.

The beam current is dynamically phased more strongly thereby at the same time is somewhat more defocused in scanning. This defocussing leads to erroneous or discardable scanning in which the video signal is substantially greater than the first field after the accumulation phase (see line b' of FIG. 3), because the strongly intensified and defocused electron beam scans neighboring interlaced kinds of the second field along with the lines of the first field. In the second field no overcharging of the signal electrode 2 that is worth mentioning is scanned off, so that the signal level in the second field lies at about 100% video level. This is both cause and indication, at the same time, for the ABC oscillation. Sufficiently slight defocusing and, with it, stability, therefore shows up when a certain signal level threshold of the signal current is exceeded in the second field (see line c' of FIG. 3). After successful raising of the ABC amplification setting value, the video signal in the first and second field following the accumulation phase $p_1$ is measured by means of the measuring pulse d'. If the field level threshold-that is set about 50% of the video signal level in the first field-is not exceeded in the second field (see line b' of FIG. 3), a new setting value provided by the control stage 11 to the ABC limiter setting input which controls the group voltage control stage 14 in such a way that the electron beam is somewhat more strongly limited in its dynamic rise. This has the effect that the video level in the first field no longer reaches the full level value after the accumulation phase for the reasons that account of the smaller amount of the defocusing the second field in the interlaced scanning pattern has increased in signal level is shown in the second field video level on line c' of FIG. 3.

Figure 3:
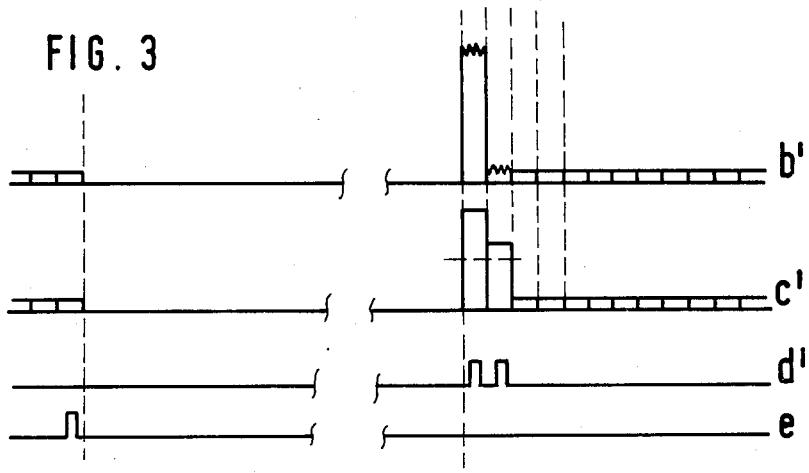
FIG. 3 is a graph on the same time scale signals appearing in the circuit of FIG. 1 in a second equilibration phase.

In order to make the 100% reference value to which all the threshold values relate, independent from the light intensity in the sensitivities of the camera tubes, the video signal is measured for the beginning of the accumulation phase $p_1$ by means of the pulse shown at the left on line e of FIG. 3 and is then stored as a reference value in the storage means 12.

Although the invention has been described with reference to a particular illustrative example, it will be understood that variations and modifications are possible within the inventive concept.

What has been referred to above as peak light effects or bright spots are also know as highlights.

I claim:

1. Equilibration method for automatic adjustment of the dynamic electron beam current reserve of a television camera tube necessary for the neutralizing of bright spots, comprising the steps of;

operating the signal electrode of the camera tube for a multiplicity of successive picture field period in a manner permitting charge to accumulate on a signal electrode with the result of general illumination of the signal electrode;

scanning the signal electrode with the camera tube electron beam giving several picture field periods in a line interlaced pattern of fields in measuring the video signals produced in the third field scan of the scanning of said several field periods;

comparing the video signal measured in said third field scanning with a first predetermined threshold value of video signal;

in the event said measured video signal is less than said first predetermined threshold value concluding the first phase of said equilibration method;

in the event said measured video signal value exceeds said predetermined first predetermined threshold value gradually magnifying the dynamic rise of the camera tube beam current until the conclusion of said first phase as aforesaid;

again accumulating the charge on the signal electrode for a multiplicity of picture periods;

thereafter scanning the signal electrode for a plurality of picture field periods in interlaced scanning pattern and during the scanning of the second picture field measuring the field signal produced;

comparing the video signal produced in the scanning of said second picture field with a second predetermined threshold value of video signals;

in the event said video signal measured during said second picture field is less than the second determined threshold value, magnifying the limiting adjustment for the rise of said in current to such an extent that in a further equilibration cycle repeating said second unit cycle, the video signal measured in said second view, exceeds said second predetermined threshold value.

2. Method according to claim 1, whererin the signal electrode is scanned with itermittent lighting out of the electron beam for a plurality of picture fields.

3. Method according to claim 1, wherein the step for producing the steps for producing an accumulation of charge in the signal electrode is performed with intermittently changing of the scanning pattern in such a way that a few occasions of the signal electrode are not impinged upon by the electron beam.

4. Method according to claim 1, wherein the steps of producing accumulation of charge on the signal electrode is formed, with intermittent field by field vertical offsetting of the scanning pattern in such way that the pattern of two successive picture fields are written one over the other.

5. Method according to claim 1, wherein the steps of producing accumulation of charge are carried out in a manner providing an integration time of between 8 to 32 picture fields.

6. Method according to claim 1, wherein at first special value is approximately 110% of a normal video signal level.

7. Method according to claim 1, wherein said second predetermined threshold value is approximately 50% of the normal video signal level of the first-scanned picture field.

8. Method according to claim 1, wherein the following the step of the measuring step performed by digitizing the measured values of video signal, then storing the digitized values, comparing the digitized values with a previously stored reference measured value, deriving in a comparison an adjustment value and storing it in digital form, converting said digital adjustment value into an anolog value and supplying said analog value to means for controlling the magnetide of the current of the camera tube for using a beam current-magnitude setting.

9. Method according to claim 8, wherein said previously stored reference measure value is derived from the video signal measured immediately before the beginning of the charge accumulation for the next video signal measurement.

* * * * *